(12) United States Patent
Purpora et al.

(10) Patent No.: US 8,407,134 B2
(45) Date of Patent: Mar. 26, 2013

(54) PASS THROUGH LIQUIDITY IN A MULTI-TIERED TRADING SYSTEM AND METHOD

(75) Inventors: Ronald A. Purpora, Staten Island, NY (US); Daniel Cleaves, Summit, NJ (US)

(73) Assignee: ICAP Services North America LLC, Jersey City, NJ (US)

( * ) Notice: Subject to any disclaimer, the term of this patent is extended or adjusted under 35 U.S.C. 154(b) by 0 days.

(21) Appl. No.: 13/558,046

(22) Filed: Jul. 25, 2012

(65) Prior Publication Data

US 2012/0310813 A1     Dec. 6, 2012

Related U.S. Application Data

(60) Division of application No. 12/903,021, filed on Oct. 12, 2010, now Pat. No. 8,260,700, which is a division of application No. 11/332,669, filed on Jan. 12, 2006, now Pat. No. 7,840,478, which is a continuation of application No. 10/990,746, filed on Nov. 17, 2004, now abandoned.

(51) Int. Cl.
*G06Q 40/04* (2012.01)

(52) U.S. Cl. ............................................. 705/37; 705/35
(58) Field of Classification Search ............... 705/35, 705/37
See application file for complete search history.

(56) References Cited

U.S. PATENT DOCUMENTS

| | | | |
|---|---|---|---|
| 4,903,201 | A | 2/1990 | Wagner |
| 5,077,665 | A | 12/1991 | Silverman et al. |
| 5,101,353 | A | 3/1992 | Lupien et al. |
| 5,915,209 | A | 6/1999 | Lawrence |
| 6,157,918 | A | 12/2000 | Shepherd |
| 6,233,566 | B1 | 5/2001 | Levine et al. |
| 6,304,858 | B1 | 10/2001 | Mosler et al. |
| 6,311,178 | B1 | 10/2001 | Bi et al. |
| 6,321,212 | B1 | 11/2001 | Lange |
| 2005/0091142 | A1 | 4/2005 | Renton et al. |

*Primary Examiner* — Jagdish Patel
(74) *Attorney, Agent, or Firm* — Dickstein Shapiro LLP

(57) ABSTRACT

The present invention generally relates to brokerage systems and methods, and more particularly, to a multi-tiered trading system and corresponding methods which allow multiple customers and multiple dealers to transact on a single platform while maintaining the distinction of an inter-dealer system and a dealer-customer relationship.

8 Claims, 3 Drawing Sheets

PASS THROUGH LIQUIDITY IN A MULTI-TIERED TRADING SYSTEM AND METHOD

CROSS REFERENCE TO RELATED APPLICATION

This application is a Divisional of U.S. patent application Ser. No. 12/903,021, filed on Oct. 12, 2010, which is a Divisional of U.S. Pat. No. 7,840,478, issued on Nov. 23, 2010, which is a Continuation of U.S. patent application Ser. No. 10/990,746, filed Nov. 17, 2004, each of which are hereby incorporated by reference herein.

BACKGROUND OF THE INVENTION

The present invention relates to a multi-tiered trading system and corresponding methods that allow multiple customers and multiple dealers to transact on a single platform while maintaining the distinction of a dealer system and a dealer-customer relationship.

Dealer-Customer Relationships

Dealers are defined as large financial institutions whose key objective is to deal in securities on behalf of their clients, both in the primary (new issue) and secondary markets. Customers of the dealers are typically large intuitional investors, including banks, hedge funds, mutual funds, corporations, and trusts. Dealers tend to be quite protective of their customer relationships because the dealer market is extremely competitive. To protect their client base, dealers have instituted a variety of trading systems that allow them to isolate their clients from and prevent their clients from establishing relationships with other dealers and/or service providers.

One way in which dealers attract customers is to invest capital in fixed income securities so as to provide liquidity within the marketplace for their customers trades. Dealers also frequently provide research services to their clients related to such securities products. Dealers often put their own capital at risk when buying and selling from clients by either (1) buying the securities first and warehousing them as inventory or (2) buying the securities and opening a new position in the market. Each of these approaches require dealers to use their own capital in order to provide liquidity to their clients. Dealers can therefore be considered market makers for their clients. While dealers prefer to buy and sell to their own clients, i.e., buying from one client to sell to another, if other clients are not prepared to trade, and the dealer is not willing to risk further capital, then the dealer will be required to utilize the open market to trade the client's securities.

How the Market Functions

Most people envision financial markets and trading systems in the context of the historical auction model used by the New York Stock Exchange (NYSE)—which operates a floor-based, open-outcry auction system with traders called specialists. While the auction model has historically been the dominant model, as technology has advanced, computerized systems have gained popularity among traders and customers. The NYSE, to some degree, has resisted computerization and continues to use the "open-outcry" auction system. Bids and offers for the stocks listed on the NYSE all go to a specific post on the floor of the NYSE. It is there that traders called specialists complete transactions.

However, other exchanges, like NASDAQ, operate electronically with a network of computers remotely connecting buyers and sellers. The NASDAQ operates an inter-dealer market represented by over 600 securities dealers trading more than 15,000 different issues. Dealers compete against each other to post the best bid and ask prices. Dealers can take customer orders either as a broker or as a dealer/principal. If the dealer acts as a broker, it arranges the trade between a buyer and seller, and receives a commission for its services. Alternatively, the dealer can act as a dealer/principal by either buying or selling from his own account, i.e., the dealer acts as a market maker.

The fixed income securities market is considered to be an over-the-counter market, i.e., a securities exchange where transactions are made via telephone or electronically rather than on a stock exchange. This means that there is no United States exchange for fixed income securities regulated by the U.S. Securities and Exchange Commission (SEC) or the Commodities Futures Trading Commission (CFTC), through which bids and offers are quoted and through which matched bids and offers are processed. Instead, regulation of over-the-counter markets is largely overseen by the National Association of Securities Dealers (NASD), a membership organization for securities-brokerage firms and underwriters in the over-the-counter market that sets guidelines for ethics and standardized practices.

The over-the-counter market is segmented into two tiers. The first is the dealer-customer market and the second is the inter-dealer or wholesale market. FIG. 1 provides an illustration of this prior art two-tier market structure. The dealer-customer market typically operates in three different manners: (1) direct relationships between the dealers A, C and C and the customers through use of each dealer's physical sales force (100); (2) direct relationships through the dealer A's electronic trading system (101), such as Credit Suisse First Boston's ("CSFB") PRIMETrade system and Deutsche Bank AG's Autobahn system; and (3) indirect relationships through a third party multi-dealer system (102), such as Thomson Corporation's TradeWeb system and MarketAxess Holdings Inc.'s MarketAxess Corporate BondTicker product.

The inter-dealer system 104 enables dealers to match trades with other dealers. In order to protect the secrecy of their customers, inter-dealer brokers will market bids and offers for securities between the different dealers participating in the inter-market without disclosing the name of the potential buyers and sellers. The inter-dealer brokers market the offerings to other dealers either through telephone contact or through an electronic trading system that enables the brokers to post offerings on terminals that are connected via a communication network to the inter-dealer broker's computer system.

Inter-dealer electronic broker systems 104 provide liquidity between the dealers and offer full trading functionality. All dealers are treated equally and a dealer can both provide liquidity (make passive markets or bid/offer) and take liquidity (hit/lift a passive bid/offer). Examples of inter-dealer automated trading systems 104 include systems operated by BrokerTec USA, LLC, Garban Intercapital's ETC and eSpeed, Inc.

Current Electronic Trading Systems

The most common form of on-line trading is stock or equity trading. This type of trading pertains only to publicly traded securities, which are securities that are registered with the SEC. Currently, at least a dozen firms have on-line trading websites for publicly traded securities.

There currently are approximately thirty (30) electronic trading systems engaged in the on-line sale and/or trading of one or more types of treasury, municipal and corporate bonds. These systems can be broken down into: (1) dealer systems that allow users to trade only with dealers, but not with each other; (2) cross-matching systems that allow users to trade with each other anonymously; (3) primary market bidding systems that allow users to bid directly on new issues; and (4) a direct issuance system that allows investors to buy securities directly from the issuer.

Limited information is available regarding the operation of most of these systems, as access is limited to authorized users. For example, CSFB's PRIMETrade system is only available to registered CSFB clients who have agreed to and signed the PRIMETrade Access Agreement. CSFB publicly describes the PRIMETrade system, which is a dealer system, as a network based trading platform that provides its customers with electronic access to Listed Derivatives; Cash Equities; European Government Bonds & Eurobonds; U.S. Treasury Bonds & Agencies; Emerging Markets Bonds; Australian and Japanese Government Bonds; and global Foreign Exchange products.

Similarly, the multi-dealer TradeWeb system is publicly described as a dealer-to-customer platform that provides liquidity for fixed-income products. The system provides a platform for trade between many of the world's primary dealers and buyside institutions. At present, the TradeWeb system provides executable prices from multiple dealers and markets in real time for ten products: U.S. Treasuries, U.S. Agencies, Commercial Paper, European Government Bonds, TBA-MBS, Pfandbriefe/Covered Bonds, Euro Supranationals/Agencies, Agency Discount Notes, ECP and Corporates. Hence, the TradeWeb system, which is effectively an auction model, enables institutional investors to receive live price quotes simultaneously from designated dealers and to trade instantly.

Inter-dealer electronic broker systems play an important role in providing liquidity between the dealers while also facilitating full trading functionality. An example of an inter-dealer electronic trading system is the exchange offered by BrokerTec.

BrokerTec provides its users with access to a deep pool of liquidity that includes major participants in both the U.S. and European fixed income marketplaces. BrokerTec remains neutral on all trades while keeping the identities of all its participants confidential, thereby providing users a platform for anonymous price discovery and trade execution. This anonymity allows customers to trade without revealing either their strategy or identity to the marketplace. Once registered with BrokerTec, dealers gain access to BrokerTec's system through a customizable front-end screen. Operating through this screen, dealers are provided with fast navigation and real-time trade execution capabilities.

The systems described only focus on supporting one tier of the market structure, and as a result, create disadvantageous for both customers and dealers. Dealers prefer to use affiliated electronic systems so that they can may maintain the exclusive nature of the customer-dealer relationship. Customers, however, are disadvantaged by such singular systems as they lack liquidity, or sufficient liquidity for many customers, so customers must use multiple dealer systems in order to have access to the best liquidity from a plurality of dealers. Customers and dealers will both need to see an advantage from using an electronic system for dealers to adopt such a service.

The introduction of multi-dealer systems has offered a partial solution for providing customer liquidity. The systems allow a customer to link to more than one dealer on the same platform. In these systems the dealer is still the market maker and the customer is still a price taker. That is to say the customer asks multiple dealers at the same time to make a price (buy or sell) a particular security for a specified size. The customer then can trade the best price efficiently.

Inter-dealer systems are exchange like and have grown to have enormous liquidity. These systems have become so important to the dealers in off-setting transactions and determining market pricing that customers have begun to request access to these marketplaces. Dealers, however, are reluctant to grant customers access to the inter-dealer markets for fear of losing customers to competing dealers. Thus, the industry is presently faced with the challenge of allowing customers access to inter-dealer systems while keeping customer-dealer relationships intact.

BRIEF SUMMARY OF THE INVENTION

The system and methods of the present invention provide customers with conditional access to the inter-dealer marketplace to facilitate the trade of financial instruments between customers and dealers, while maintaining established customer-dealer relationships. Dealers can control access to the inter-dealer marketplace so that a dealer has the first option to trade with a customer. Dealers provide customers access to the marketplace by registering their customers with an inter-dealer system. During registration, the dealer may specify minimum and maximum trade amounts and may set up customers by naming different customer locations and traders. Dealers also establish parameters for the auto execution of customer orders based on a comparison of the customer order with the prices and sizes available in the market place. Dealers can later change these parameters in real time. When a customer places an order, the order is compared to the market place and if the price is better than the existing market price, but not sufficiently better to auto execute, the dealer has the first option to trade the order before it is entered into the marketplace. The dealer has a specified time to execute a trade before it will be entered into the inter-dealer market.

DETAILED DESCRIPTION OF THE INVENTION

The following detailed description is given by way of example and is not intended to limit the present invention solely to any example or embodiment described therein. The description will be best appreciated in conjunction with the accompanying drawings.

The system of the present invention includes an automated facility that enables dealers, at their option, to manually or automatically direct customer orders to an inter-dealer exchange or to fill the order and not pass it on to the exchange. The automated facility would be comprised of a central computer system, having some form of memory for storing information entered by customers and dealers, in communication with one or more dealers and customers, who interact with the computer and each other through some form of user interface, such a computer networked to the central computer, through a networked terminal, or even handheld and wireless devices in communication with the central computer.

For purposes of the present invention, the central computer is described as such, but need not actually be centrally located. Rather, the central computer could be integrated into the dealer's computer system, managed as an independent computer system, or even as a third party system. The central computer also need not be relied upon to perform each and every function of the methods described herein. For example, comparison results could be generated by the central computer, or by the customer's computer, or by the dealer's computer. Likewise, the customer interface need not be limited to a physical machine located at the customer's location, but rather could just be a secondary screen or portion of a screen used by the dealer or another party that is in communication with the customer and capable of entering orders on the customer's behalf.

Figure 1:
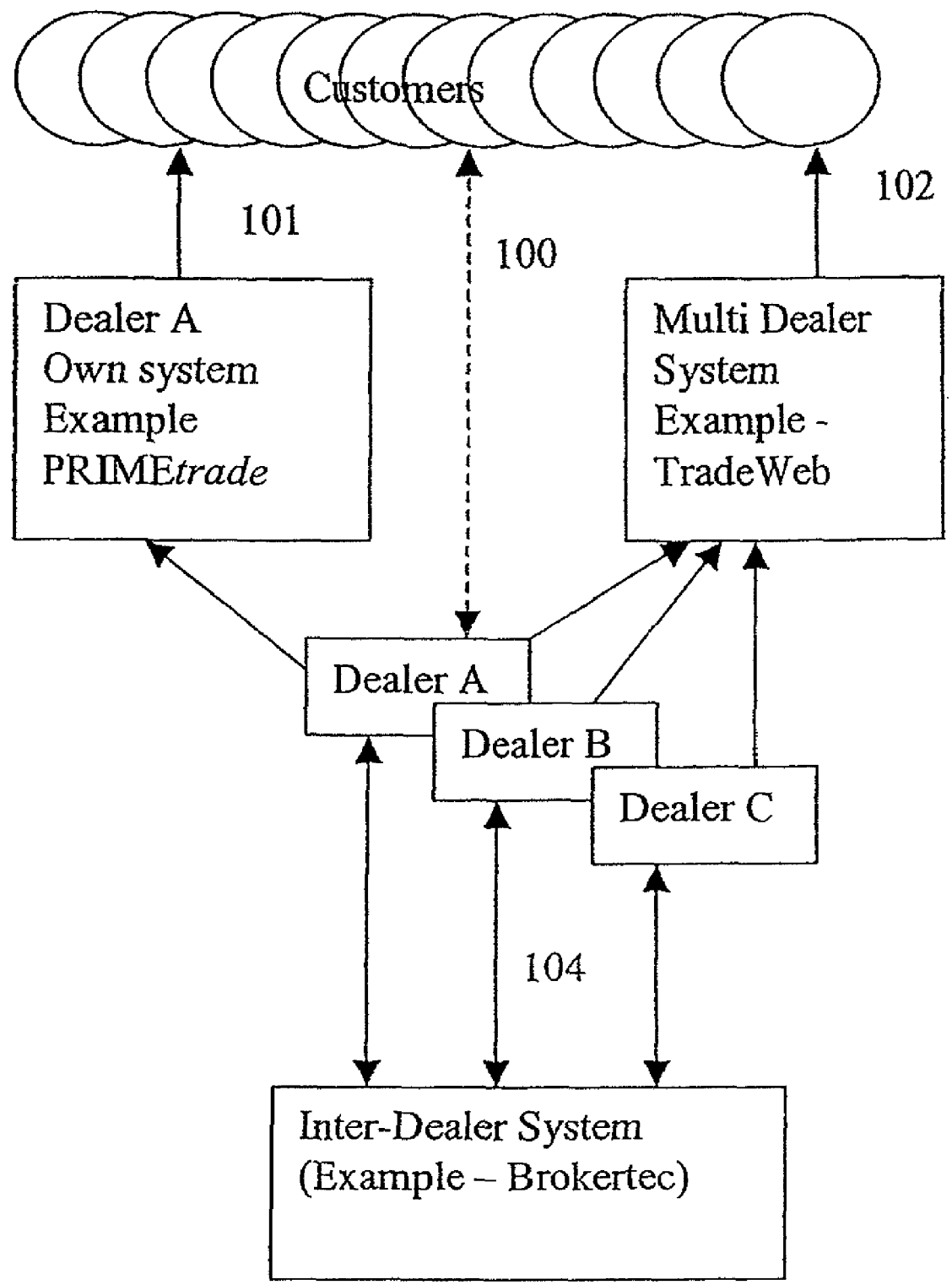
FIG. 1 is a graphical illustration of the existing market structure.
Figure 2:
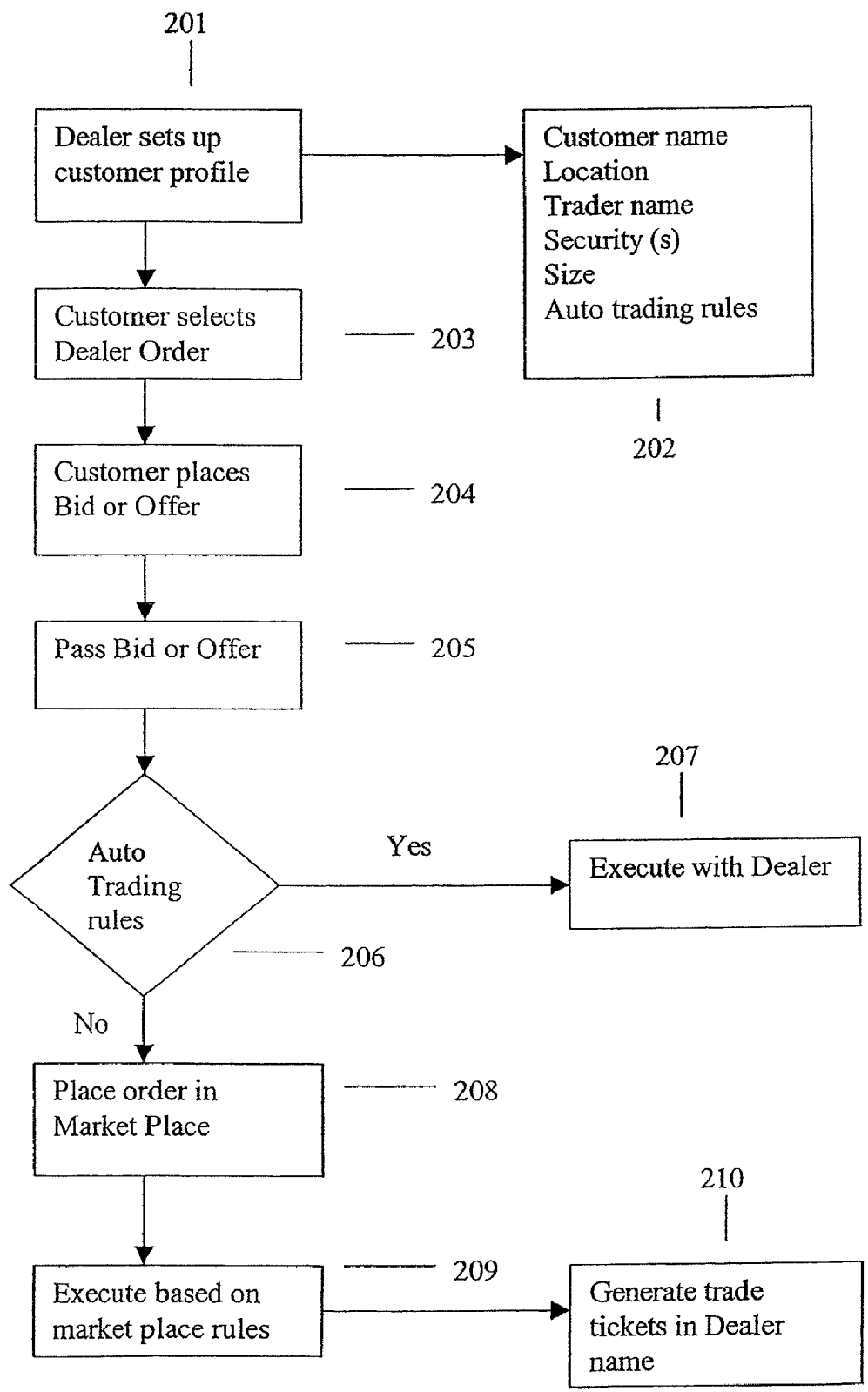
FIG. 2 is a flow chart broadly illustrating the operation of the pass through multi-tiered trading system of the present invention.

With reference to FIG. 2, customers only have access to view or trade in the exchange if one or more dealers have registered the customer 201 and established a trading profile 202. The trading profile 202 can define the customer name, different locations, different traders names, the type of security (s), maximum and minimum trade sizes, and auto trading rules or price parameters. If more than one dealer has registered a customer with the exchange, the customer or a primary dealer can select an order of priority between the dealers 203 and have this entered into the system.

Once a customer places a bid or offer 204, the dealer is given a first look at the bid/offer and a determination is made by the dealer whether it will fill the bid/order or pass the bid/order to the exchange 205. If the dealer decides to fill the bid/order, it then deals with the customer directly 206. If the dealer decides not to take any capital risk on the bid/order and directs it to the exchange 205, then the dealer will act solely as a clearing dealer 210. In other words, when the customer completes a trade with the exchange, the exchange will still indicate that the trade was executed through the dealer, as though the dealer had bought or sold the security itself 211. The dealer, and not the exchange, will be responsible for settlement with the customer. Assuming the dealer can settle the transaction with the customer, then the dealer will be able to settle the transaction with the marketplace, resulting in a zero risk position.

If a dealer has established auto trading rules 207 for a particular customer, that customer's bid/order might be settled with the selected dealer 208 or placed directly in the system without first giving the dealer an opportunity to trade 209 or decide. Auto trading could be established in numerous different scenarios and in numerous different ways, the most likely of which would be where the size or price of the customer's bid/order is above or below a threshold level. Orders that are too small or too large might not be appropriate for either the dealer or the market to efficiently handle, while prices that are too high or too low may not be desirable to the dealer for other reasons.

Auto trading could occur before the dealer has the first look, or afterwards, as shown in FIG. 2. Although the customer's order would also typically first be compared to the current market within the exchange before auto trading rules could be applied, that is not always the case. For example, a dealer could designate a particular customer account to always receive first look status, irrespective of the market, such that a customer order will not automatically start a trade in the inter-dealer exchange. With the first look designation activated, all orders that join or establish a best bid or offer level in the market will be put into a fill state, a predetermine period of 10 seconds (or smaller or larger) where a dealer can decide if he wants to fill the order or send it to the exchange. This enables the dealer to have the option of filling a partial or total amount of the order before it is sent to the inter-dealer exchange. With auto trading, all orders that are entered at levels that do not join or establish a bid or offer level will be immediately sent to the exchange 209 and the dealer will not be granted the option to fill the customer's order.

The dealer will also have the ability to run rule-sets against client orders in their names. The rule-sets will filter and organize orders entered by customers based upon pre-established criteria, such as type of financial instrument, size, client institution, time of day, etc. The filters could be modifiable in real-time. Rules could be applied on an all-or-nothing basis or there could be partial customer fills with the balance being sent to the inter-dealer exchange for execution. The multi-dealer exchange provides a front-end graphical user interface for dealers to control the rule-set parameters.

As previously noted, the first look trading system provides a graphical user interface to a customer with a front-end application to access real time pricing in the central marketplace and to place limit orders (specified amount and price). When a customer places or enters a limit order, it is passed by the system to the designated dealer. Once the dealer receives the order(s), it can be matched automatically by the dealer or passed on to the marketplace. Through the dealer's display terminal, the dealer can either (1) set up rules to automatically execute all or part of orders that fall within its first look parameters, or (2) have all or part of orders that meet certain first look parameters "pop up" with a timer for the dealer to manually select an action.

Customer orders will typically be entered as limit orders for a specified par (dollar) amount. For example, although the present invention is applicable to any type of financial instrument, if utilized in the context of fixed income securities, and order might be for $100 mm of a particular security at a price of X. When the dealer has set up the automatic execution of orders, the dealer is provided with an administrative tool that allows him/her to enter parameters for processing a customer order (including minimum order size, maximum order size, price spread to the market price and conditions to allow the dealer to execute within the system timer settings). Orders entered by the customer that match the parameters will not be passed to the marketplace and the existence of the transaction will only be known by the dealer and the customer. Alternatively, depending on the circumstances, the dealer could choose to match part of the order and send the rest to the exchange.

For example, assume the market for a particular security is bid Amount X for price Y and offer for Amount A for Price B and a customer wished to buy Amount C at Price D. If Amount C is greater than or equal to the market place offer Amount A, and the Amount C is greater than or equal to the parameters set by the dealer for minimum/maximum order, all or part of the order will be auto executed by the dealer. If the Amount C is less than the offer Amount A, or if the Amount C falls outside the range set by the dealer, the order will appear on the dealers computer interface in a pop up asking the dealer if he wishes to execute the order or pass it to the marketplace. The dealer will have a specified time (i.e., ten seconds) to respond otherwise the order will be passed to the marketplace.

The predetermined time for the dealer to respond could be based on the price level that the customer enters or some other parameter. Any order that satisfies a trading level will not create a transaction in the inter-dealer system, but will be directly matched between the customer and the clearing dealer. This structure will allow the dealer to assume the risk and act as counter-party to selected trades. The dealer will have the ability to set limits for both transactions, where the dealer opts to fill its customer's order, and its overall risk, when the dealer acts as a clearing dealer for each customer.

For both types of trades, the dealer must first have the customer signed on with a clearing agreement. The dealer must then specify which customers they want for the first look function. During registration, the administrator can establish the customer trading parameters determined by the clearing dealer. These parameters could include, types of securities, size, time, price ranges, and approved traders or desks. The parameters may be periodically changed by the dealer.

In a preferred embodiment, in order to transact with the first look trading system at a tradable level, the customer must first lock on an existing bid or offer in the inter-dealer exchange and then via the multi-dealer exchange enter either a buy or sell order for a specified size. The locked on bid or offer must remain on the screen for a specified time, for example, two (2) seconds after the execution is entered. If this requirement is met and the dealer's system is set for all or none, then the dealer is responsible for taking the counter-party risk entered for the total size, regardless of the size of the locked on bid or offer. If the locked on bid or offer cancels or drops back within the two (2) second hold time, the dealer will not be responsible to print the level and the order will be entered into the system in an order state as a resting bid or offer for ten (10) seconds before being sent to the exchange. The customer will not have the ability to cancel the order during the hold time.

Additionally, all passive or resting orders that were the result of off market orders, will be immediately sent to the exchange, but will still be subject to the two (2) second hold time. The customer will then have the ability to cancel any order after the two (2) seconds are satisfied. All orders that are matched will be immediately filled and there will be no time for cancellation by the customer. Any crossed market order will be immediately filled for the specified size. With resting bids and offers, the dealer will have the ability to release the risk at any time and send the order directly to the inter-dealer exchange. If the dealer decides to not release the risk, the orders will be left in the clearing state for ten (10) seconds or until the market is either bid/offered or prints at the level. Once these requirements are met, the trade will print and the order will be deleted from the book.

Upon execution, the dealer will receive a pop up notification detailing the trade with security, size, price, time and counter-party information.

Figure 3:
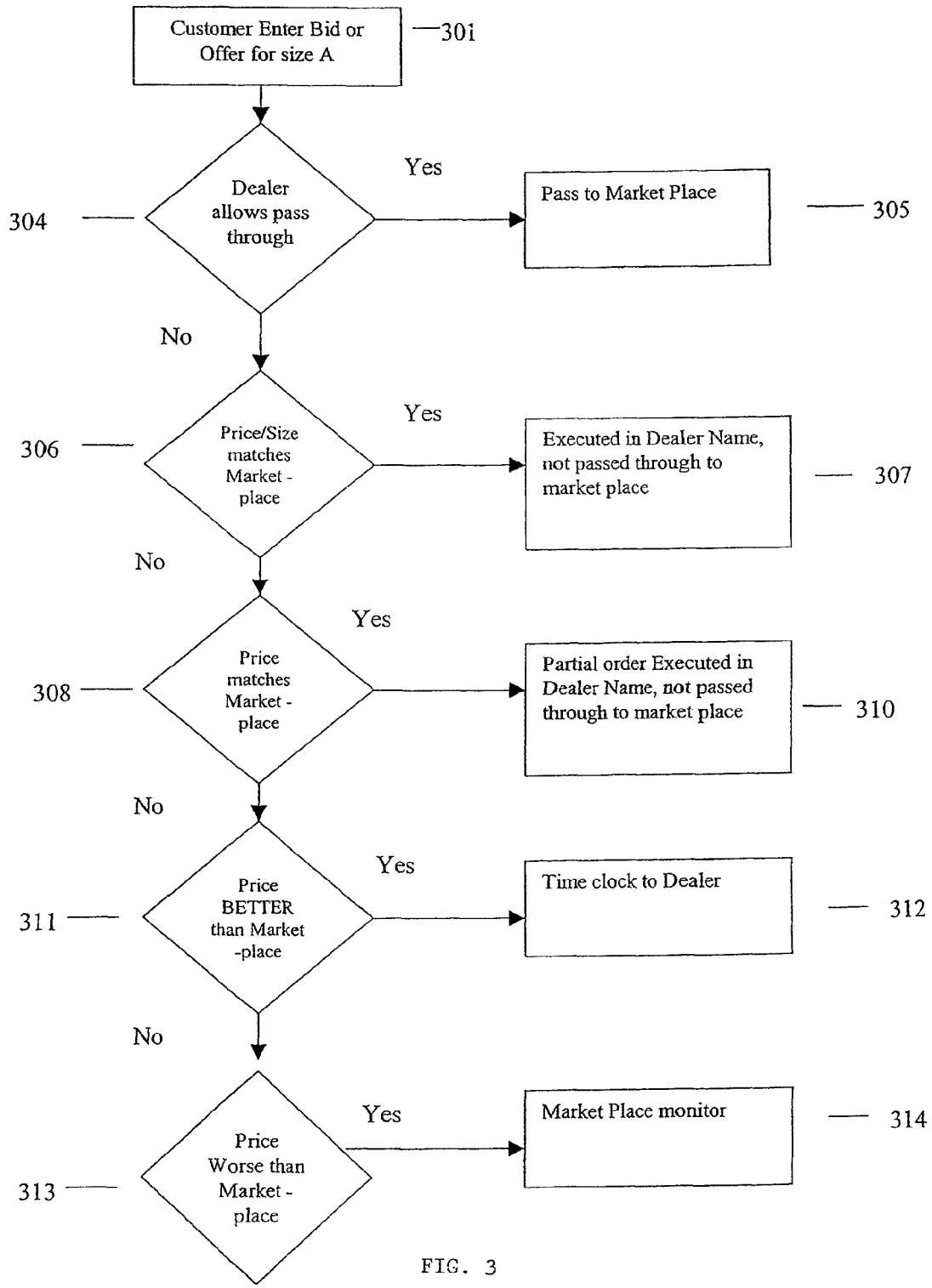
FIG. 3 is a flow chart of the auto trading rules for customer orders

FIG. 3 illustrates the steps to be followed in placing a customer order in line with the auto trading rules set up for customer orders. The process begins when a customer enters a bid or offer 301 into a multi-dealer exchange and the order is compared to the current market for the specified financial instrument within the exchange. Customer Orders are thereafter directed as follows:

Case 1—Dealer allows pass through 304 and customer orders are directed to the exchange and matched or entered as a resting bid or offer 305.

If the dealer chooses to provide the customer with direct access to the inter-dealer exchange, the dealer will act in a clearing capacity and not have the ability to take the opposing position to the customer order entered. Each order will be directly matched or stored in the exchange.

Case 2—Customer order matches an existing bid, offer or workup level 306 in the market place where there are contra buyers or sellers at the level of the inter-dealer's screen (i.e., order matches a "tradable level" within inter-dealer exchange).

If the order meets the dealer's parameters, the dealer will immediately fill the order and the order never enters the system 307. The marketplace does not receive a flash or other transparency that indicates the order has traded. Under such circumstances, the first look system is completely automated, with dealer managed rule-sets being completely exercised within the multi-dealer system, to minimize the additional latencies introduced by an additional layer of order matching in the inter-dealer exchange.

Case 3—Customer order partially matches an existing bid, offer or workup level 308 in the market place, where there are contra buyers or sellers at the same level of the inter-dealer screen.

Due to the filter setting for the specific customer, a partial order is immediately filled by the dealer 310, but the balance will then carry into the inter-dealer exchange and either match with existing liquidity or be entered as a stored bid or offer.

Case 4—Customer order does not match a tradable level within the inter-dealer exchange, but it is better than or equal to the best bid or offer in the market 311. In such a case, the order is entered into a separate order book for ten (10) seconds 312 awaiting a fill by the clearing dealer. If there is no fill, the order is sent to the exchange.

The dealer would hold the order in an internal matching book for ten (10) seconds 312. If the order price level should become tradable during this period, i.e., for at least 1 million of a fixed security within the trading system, then the dealer must immediately fill the client order at that price level. The dealer would also have the option of executing the orders in this state either through a manual or automated process.

Case 5—Customer order does not match a tradable level within the inter-dealer exchange, and it is not better or equal to the best bid or offer in the market, order is sent to the exchange 313.

All customer limit orders that do not better or equal the best bid or offer, regardless of whether they are set for first look by the dealer, will immediately be sent to the exchange 314 and the dealer will not have the ability to act as a contra party and take on the risk of the trade.

All trades are entered into the first look system by customers and dealers through an application programming interface (API). The customer sees the trades in their trading blotter with the same information, but their price incorporates any commission for the transaction. Dealers could also charge their customers for use of the system. The system would likely also collect a processing fee.

The following examples serve to further illustrate the invention. However, those skilled in the art of the foregoing invention will recognize that numerous alternatives, modifications, and variations that may be implemented.

EXAMPLE 1

Customer A wishes to buy 5 million of financial instrument X at $100 10/32. Customer A's dealer, Dealer K, determines that he cannot fill Customer A's order. Dealer K had previously registered Customer A with an inter-dealer exchange. Dealer K directs Customer A to the inter-dealer exchange where Customer A enters her bid to purchase financial instrument X. The inter-dealer exchange has an offer for financial instrument X at a price of $100 10/32 and is able to match this offer with Customer A's order. The transaction is cleared through Dealer K.

EXAMPLE 2

The inter-dealer market for financial instrument X is offer amount of 5 million at a price of $100 10/32/$100 11/32. Customer A enters into the system a buy order for 10 million of financial instrument X at a price of $100 11/32. The system matches half of the customer order with the 5 million offer that is available at the inter-dealer market. Customer A's bid for 5 million of financial instrument X is cleared through Customer A's selected dealer.

EXAMPLE 3

Financial Instrument X has a pre-existing bid and offer of $100 10/32 and $100 11/32. The quantity of both of these orders is 5 million. Customer A enters an aggressive buy order with storable characteristics at $100 10/32 for 5 million. This order does not meet a minimum quantity requirement to be first shown to the selected Dealer and immediately enters the exchange. Additionally, as this incoming order does not match the current offer order in the market ($100 11/32), and has storable characteristics, the order is placed in the market at $100 10/32 behind the pre-existing bid order. The resulting orderbook for Financial Instrument X has 2 bids at $100 10/32 totaling 10 million and one offer at $100 11/32 for 5 million.

Another participant in the market hits (sells to) the $100 10/32 bid orders for a quantity of 10 million and both the pre-existing bidder and Customer A are filled on their orders for 5 million each.

EXAMPLE 4

In some instances, a dealer will utilize the option to conduct a transaction directly with his customer using the first look functionality and the customer order will not be entered into the inter-dealer market. An illustration of this scenario is as follows: A customer enters a buy order for 5 m of a financial instrument at $100 11/32. The inter-dealer market offers the financial instrument at the same quantity and the same price as the customer order. The dealer also is able to fill the customer order at the same price and quantity that the customer has requested. In this scenario, the dealer will opt to fill the order himself and the customer will not enter the inter-dealer exchange.

EXAMPLE 5

The inter-dealer exchange offers 5 million of financial instrument at $100 10/32/$100 11/32. Customer B's dealer, Dealer K, has established that she can fill a bid of financial instrument X at $100 11/32 for a maximum size of 25 million. Customer B enters an order to buy 10 million of financial instrument X at $100 11/32. Customer B's order is filled by Dealer K directly and Customer B never enters the inter-dealer exchange.

EXAMPLE 6

Customer A enters a buy for 30 million of financial instrument X at $100 11/32 into the system. Dealer K has set up in the parameters a 25 million maximum purchase size for financial instrument X. The inter-dealer exchange can take $100 10/32 or $100 11/32 for a bid of $5 million of financial instrument X. Customer A will buy 25 million of financial instrument X from the dealer directly. Customer A will also buy 5 million of financial instrument X at $100 11/32 with Dealer K clearing the transaction.

EXAMPLE 9

The inter-dealer exchange has an offer for 5 million of financial instrument X at a price of $100 10/32/$100 11/32. Customer B enters into the system a bid of $100 10/32 for 5 million of financial instrument X. Customer B's bid enters into the fill state, a ten second period during which time the dealer decides if he wants to fill the order or send it to the inter-dealer exchange. Within the ten second time frame, the inter-dealer market price for financial instrument X changes to $100 10/32/$100 10/32. Before the ten second fill state elapses, the dealer opts to fill the order. Customer B buys 5 million of financial instrument X at $100 10/32 directly from the dealer.

EXAMPLE 10

The inter-dealer exchange has an offer for 5 million of financial instrument X at a price of $100 10/32/$100 11/32. Customer A enters a bid for 5 million of financial instrument X at $100 10/32. Customer A's bid is entered into a fill state for ten seconds. The ten seconds elapse without Customer A's dealer filling the order. The order is therefore sent to the inter-dealer exchange. A dealer on the inter-dealer exchange fills Customer A's bid for 5 million of financial instrument X at $100 10/32. The transaction is cleared through Customer A's dealer.

The invention claimed is:

1. A method for enabling a dealer to selectively grant a customer operating a computer access through a network to a central computer system forming an inter-dealer exchange to trade one or more financial instruments of said customer, the method comprising the steps of:
    the central computer system receiving a customer order for a financial instrument;
    the central computer system determining whether said customer order matches a predetermined trade parameter established by said dealer;
    the central computer system sending all or part of said customer order to said inter-dealer exchange if said customer order does not match said trade parameter as though said customer order is being placed by said dealer instead of said customer;
    the central computer system filling all or part of said customer order if said customer order matches said trade parameter; and
    the central computer system clearing a transaction between said customer and another dealer if said customer order is all or partially filled by said another dealer through said inter-dealer exchange.

2. The method of claim 1, wherein said step of determining is performed automatically based on said predetermined trade parameters and a customer profile corresponding to said customer.

3. The method of claim 1, wherein said step of determining includes signaling said dealer to alert said dealer of said customer order and to enable said dealer to decide whether to send all or part of said customer order to said inter-dealer exchange despite said predetermined trade parameter.

4. The method of claim 3, wherein said step of signaling is limited to a predetermined amount of time.

5. The method of claim 4, wherein once said predetermined amount of time has elapsed, said customer order to sent to said inter-dealer exchange.

6. The method of claim 1, wherein said step of receiving said customer order includes the step of entering said customer order by said customer and locking on an existing bid or offer in the inter-dealer exchange.

7. The method of claim 6, wherein said customer must lock on said existing bid or offer for a predetermined amount of time.

8. The method of claim 7, wherein during said predetermined amount of time, said customer order cannot be cancelled.

* * * * *